(12) United States Patent
Kamidi

(10) Patent No.: US 9,921,558 B2
(45) Date of Patent: Mar. 20, 2018

(54) METHODS FOR INTELLIGENTLY THROWING A BALL TO A DYNAMICALLY DETECTED USER AND DEVICES THEREOF

(71) Applicant: Neel Kumar Kamidi, San Jose, CA (US)

(72) Inventor: Neel Kumar Kamidi, San Jose, CA (US)

( * ) Notice: Subject to any disclaimer, the term of this patent is extended or adjusted under 35 U.S.C. 154(b) by 295 days.

(21) Appl. No.: 14/827,706

(22) Filed: Aug. 17, 2015

(65) Prior Publication Data

US 2016/0051876 A1  Feb. 25, 2016

Related U.S. Application Data

(60) Provisional application No. 62/038,472, filed on Aug. 18, 2014.

(51) Int. Cl.
| | |
|---|---|
| G05B 21/00 | (2006.01) |
| G01M 1/38 | (2006.01) |
| G05B 13/00 | (2006.01) |
| G05B 15/00 | (2006.01) |
| G05D 23/00 | (2006.01) |
| G05B 15/02 | (2006.01) |
| G06F 3/01 | (2006.01) |
| G06F 3/03 | (2006.01) |
| A63B 69/40 | (2006.01) |

(52) U.S. Cl.
CPC ............. *G05B 15/02* (2013.01); *G06F 3/011* (2013.01); *G06F 3/0304* (2013.01); *A63B 69/40* (2013.01)

(58) Field of Classification Search
CPC ......... G05B 15/02; A63B 65/12; A63B 69/40; G06F 3/011; G06F 3/0304
See application file for complete search history.

(56) References Cited

U.S. PATENT DOCUMENTS

| | | | |
|---|---|---|---|
| 4,299,383 A | 11/1981 | Yuasa | |
| 6,152,126 A | 11/2000 | Smith et al. | |
| 7,691,012 B2 | 4/2010 | Cucjen et al. | |
| 8,448,631 B2 | 5/2013 | Spicer et al. | |
| 9,010,309 B2 * | 4/2015 | Lewis | A63B 69/40 124/4 |
| 9,724,584 B1 * | 8/2017 | Campbell | A63B 69/0071 |
| 2002/0148455 A1 * | 10/2002 | Trajkovic | A63B 24/00 124/34 |
| 2005/0172943 A1 | 8/2005 | Cucjen et al. | |
| 2013/0167290 A1 * | 7/2013 | Ben Ezra | A63B 71/10 2/425 |
| 2013/0203527 A1 * | 8/2013 | LoDuca | A63B 69/0075 473/418 |

* cited by examiner

*Primary Examiner* — Vincent Tran
*Assistant Examiner* — Zhipeng Wang

(57) ABSTRACT

A method, non-transitory computer readable medium, and a ball throwing management computing device that assists with intelligently throwing a ball to a dynamically detected user includes receiving health information associated with a user from a user computing device. A location and height of the user associated with the received health information is detected. A speed, a direction, a trajectory and a frequency at which the ball can be propelled to the user is determined based on the received health information and the detected location of the user without user intervention. Propelling the ball to the user based on the determined speed, direction and frequency is assisted.

15 Claims, 4 Drawing Sheets

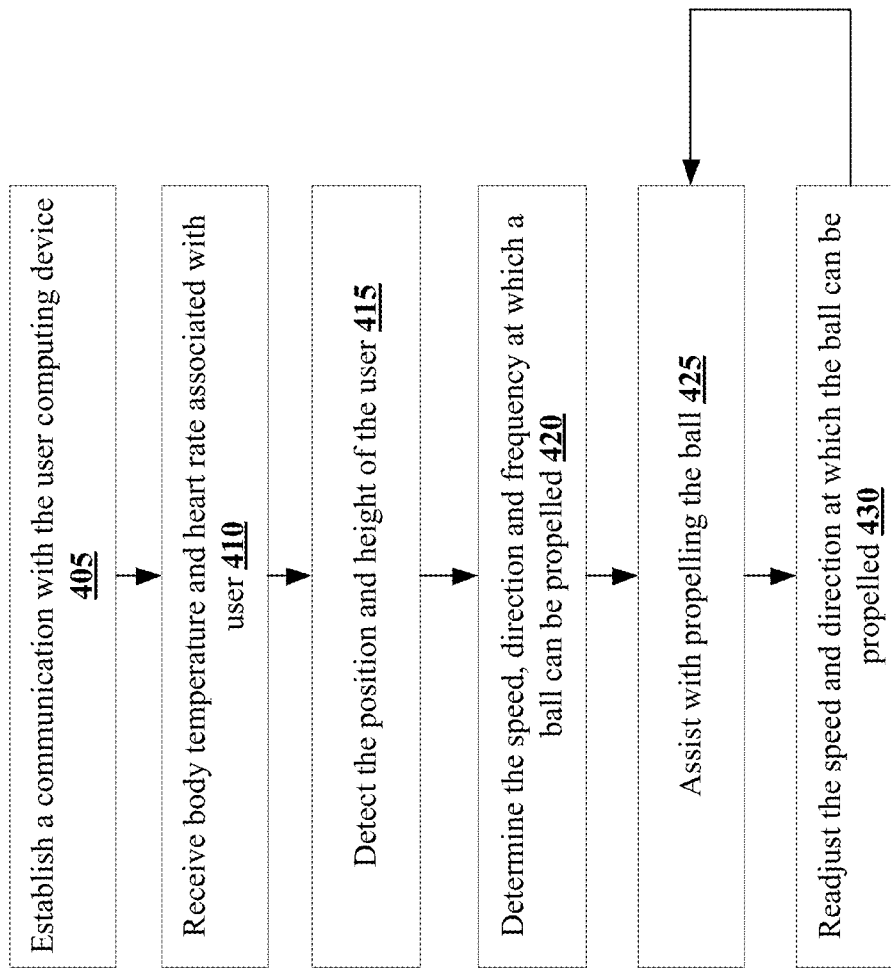

METHODS FOR INTELLIGENTLY THROWING A BALL TO A DYNAMICALLY DETECTED USER AND DEVICES THEREOF

This application claims the benefit of U.S. Provisional Application No. 62/038,472, filed Aug. 18, 2014, which is hereby incorporated by reference in its entirety.

FIELD

This technology generally relates to a ball throwing machine, more particularly, to methods for intelligently throwing a ball to a dynamically detected user and devices thereof.

BACKGROUND

Traditional ball throwing machines were good at executing repetitive actions but with very limited ability for variations. For example, traditional ball throwing machines can only throw the ball to a fixed position at a time requiring the user or operator to change the settings to target different positions and quite often involved trial and error method to be able to target a specific position.

Other traditional ball throwing machines included set programs that assisted the ball throwing machines to randomly propel to ball in different direction. However as noted earlier, these traditional ball throwing machines again required a user to change the settings to target different position manually and required trial and error techniques to target specific position. Unfortunately, none of these traditional ball throwing machines had the technology to dynamically determine the position of the user and adjust with speed and direction of throwing the ball without requiring user intervention.

SUMMARY

A method for intelligently throwing a ball to a dynamically detected user includes receiving by a ball throwing management computing device health information associated with a user from a user computing device. A location and height of the user associated with the received health information is detected by the ball throwing management computing device. A speed, a direction, a trajectory and a frequency at which the ball can be propelled to the user is determined by the ball throwing management computing device based on the received health information and the detected location of the user without user intervention. Propelling the ball to the user based on the determined speed, direction and frequency is assisted by the ball throwing management computing device.

A non-transitory computer readable medium having stored thereon instructions for intelligently throwing a ball to a dynamically detected user comprising machine executable code which when executed by at least one processor, causes the processor to perform steps including receiving health information associated with a user from a user computing device. A location and height of the user associated with the received health information is detected. A speed, a direction, a trajectory, and a frequency at which the ball can be propelled to the user is determined based on the received health information and the detected location of the user without user intervention. Propelling the ball to the user based on the determined speed, direction and frequency is assisted.

A ball throwing management computing device comprising a processor, a memory, wherein the memory coupled to the processor which is configured to execute programmed instructions stored in the memory including receiving health information associated with a user from a user computing device. A location and height of the user associated with the received health information is detected. A speed, a direction, a trajectory and a frequency at which the ball can be propelled to the user is determined based on the received health information and the detected location of the user without user intervention. Propelling the ball to the user based on the determined speed, direction and frequency is assisted.

This technology provides a number of advantages including providing more effective methods, non-transitory computer readable medium and devices for intelligently throwing a ball to a dynamically detected user. The technology disclosed herein uses parameters such as location of the user, height of the user, health related parameters associated with the user to make a decision regarding the speed, direction and frequency of propelling the ball without requiring user intervention.

BRIEF DESCRIPTION OF THE DRAWINGS

FIG. 4 is an exemplary flowchart illustrating a method for intelligently throwing a ball to a dynamically detected user.

DETAILED DESCRIPTION

Figure 1:
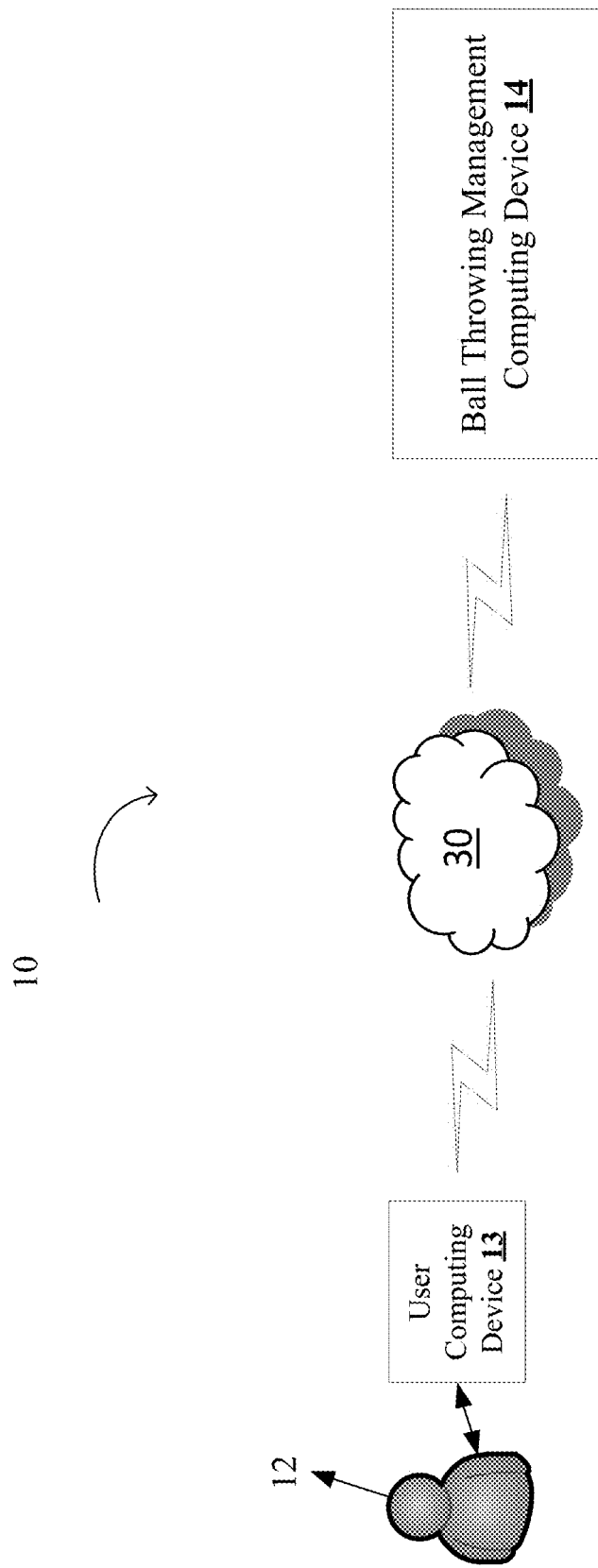
FIG. 1 is a block diagram of an exemplary environment with a ball throwing management computing device for intelligently throwing a ball to a dynamically detected user.

An exemplary environment 10 including a user computing device 12 and a ball throwing management computing device 14 for intelligently throwing a ball to a dynamically detected user illustrated in FIG. 1. The exemplary environment 10 includes a user 12 using a user computing device 13, the ball throwing management computing device 14, and which are coupled together by a communication network 30, although the environment can include other types and numbers of devices, components, elements, and communication networks 30 in other topologies and deployments. This technology provides a number of advantages including providing more effective methods, non-transitory computer readable medium and devices for intelligently throwing a ball to a dynamically detected user.

The ball throwing management computing device 14 assists with intelligently throwing a ball to a dynamically detected user as illustrated and described with the examples herein, although ball throwing management computing device 14 may perform other types and numbers of functions. The ball throwing management computing device 14, at least one CPU/processor 18, memory 20, camera 22, plurality of sensors 23, input/output system 24, which are all coupled together by bus 26, although ball throwing management computing device 14 may comprise other types and numbers of elements such as a ball propeller, ball feeder or ball propeller opening in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 3:
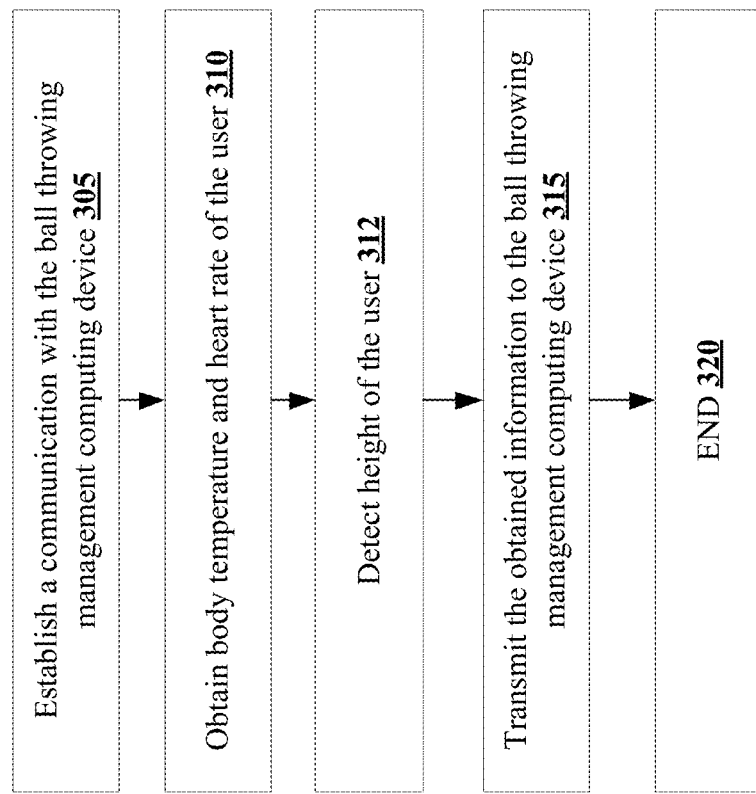
FIG. 3 is an exemplary flowchart illustrating a method for sending user health information to the ball throwing management computing device.

Memory 20 may comprise one or more tangible storage media, such as RAM, ROM, flash memory, CD-ROM, floppy disk, hard disk drive(s), solid state memory, DVD, or other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIGS. 3 and 4 is representative of example steps or actions of this technology that may be embodied or expressed as one or more non-transitory computer or machine readable instructions stored in memory 20 that may be executed by the processor(s) 18.

The ball throwing management computing device 14 includes a camera 22 that assists with recording images and detecting the position, distance, and height of the user 12 using the user computing device 13, although the camera 22 can assists with other types or amounts of functions. In this example, the camera 22 can be a range finder camera, or a digital camera although other types or amounts of camera can be used to detect the position of the user 12 using the user computing device 13. In this example, the ball throwing management computing device 14 uses the information from the camera 22 to determine the direction in which the ball can be propelled to the user 12 using the user computing device 13, although the ball throwing management computing device 14 can use the information from the camera 22 for other types or amounts of operations.

Figure 2:
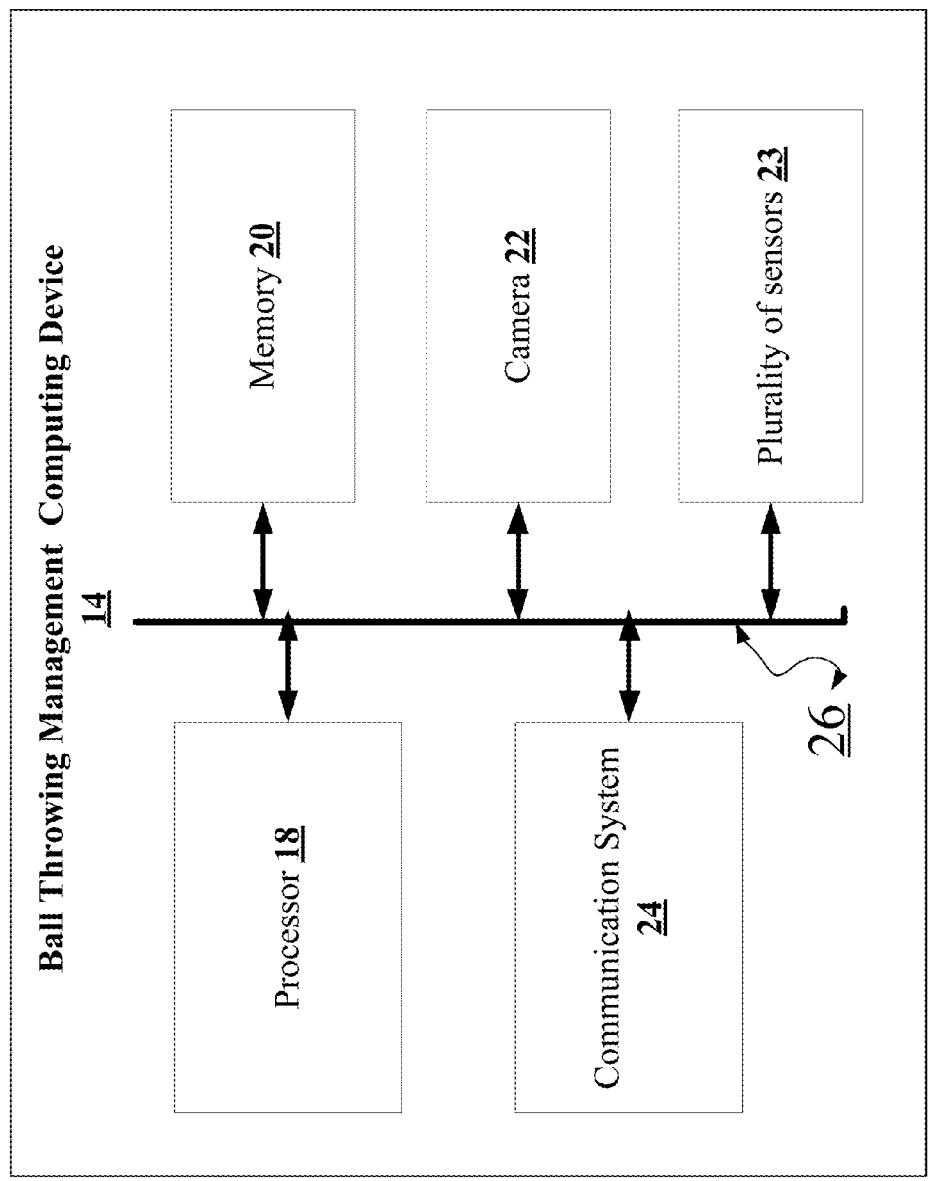
FIG. 2 is an exemplary functional block diagram of the of the example of the ball throwing management computing device shown in FIG. 1.

Additionally as illustrated in FIG. 2, the ball throwing management computing device 14 includes a plurality of sensors 23 that receives information such as the body temperature of the user 12 using the user computing device 13, heart rate of the user 12 using the user computing device 13 from the user computing device 13, detecting the distance between the user 12 using the user computing device 13 and the ball throwing management computing device 14, although the plurality of sensors 23 can receive other types or amounts of information from other devices. In this example, the plurality of sensors 23 uses the information received from the user computing device 13 to adjust speed at which a ball can be propelled to the user 12 using the user computing device 13, although the ball throwing management computing device 14 can use the information from the plurality of sensors 23 to perform other types or amounts of information.

The communication system 24 in the ball throwing management computing device 14 is used to operatively couple and communicate between the ball throwing management computing device 14, and the user computing device 13 although other types and numbers of systems, devices, components, elements and/or networks with other types and numbers of connections and configurations can be used. By way of example only, the ball throwing management computing device 14 can interact with the user computing device 13 and other devices via a communication network 30 such as Local Area Network (LAN), Bluetooth®, Infrared, Wi-Fi, and Wide Area Network (WAN) and can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other types of buses and/or other links may be used, such as PCI.

Further in this example, the user 12 uses the user computing device 13. The user computing device 13 includes a central processing unit (CPU) or processor, a memory, an interface device, plurality of sensors, input device and display device, which are coupled together by a bus or other link, although each could have other types and numbers of elements and/or other types and numbers of network devices could be used in this environment. The client computing device 12(1)-12(n), in this example, may run applications that may provide the ball throwing management computing device 14 with information associated with the body temperature of the user 12, heart rate of the user 12, although the user computing device 13 can provide other types or amounts of information to the ball throwing management computing device 14.

It is to be understood that the methods of the examples described herein are for exemplary purposes, as many variations of the specific hardware and software used to implement the examples are possible, as will be appreciated by those skilled in the relevant art(s).

Furthermore, each of the methods of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as then the non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for intelligently throwing a ball to a dynamically detected user will now be described with reference to FIGS. 1-4. First, an exemplary illustration of the user computing device sending user health information to the ball throwing management computing device will now be illustrated with reference to an exemplary flowchart illustrated in FIG. 3.

In step 305, the user computing device 13 first establishes a communication with the ball throwing management computing device 14 via communication network 30, although the user computing device 13 can establish communication with the ball throwing management computing device 14 using other topologies. In this example, an application executing on the user computing device 13 assists with establishing a communication with the ball throwing management computing device 14 via Bluetooth®, or Wi-Fi, although the user computing device 13 can establish communication with the ball throwing management computing device 14 using other techniques. By way of example, user 12 using the user computing device 13 can select one of the techniques of establishing communication with the ball throwing management computing device 14 using an input device of the user computing device 13.

In step 310, the user computing device 13 using the plurality of sensors within the user computing device 13 obtains health related information associated with the user such as body temperature of the user 12, or heart rate of the user 12, blood pressure of the user 12 and/or respiratory rate of the user 12, although the plurality of sensors within the user computing device 13 can assist with obtaining other types or amounts of information associated with the user. In this example, the plurality of sensors within the user computing device 13 provides the health related information associated with the user 12 to the user computing device 13 in real-time.

Next in step 312, the user computing device 13 detects the height of the user 12 based on the information from the plurality of sensors within the user computing device 13, although the user computing device 13 can detect the height of the user 12 based on the information entered by the user 12 on the user computing device 13 via the input device.

In step 315, the user computing device 13 transmits the obtained health related information associated with the user 12 to the ball throwing management computing device 14 using the communication that was established in step 305, although the user computing device 13 can provide other types or amounts of information associated with the user 12 to the ball throwing management computing device 14 and the exemplary method ends in step 320. As illustrated above, the user computing device 13 continually sends the health related information and the detected height associated with the user 12 to the ball throwing management computing device 14 in real-time.

Now with reference to FIG. 4, an exemplary method for intelligently throwing a ball to a dynamically detected user using the information received from the user computing device will now be illustrated.

In step 405, the ball throwing management computing device 14 receives a request to establish a communication with the user computing device 13 from the user computing device 13 via communication network 30, although the ball throwing management computing device 14 can receive the request to establish connection via other topologies. Upon receiving the request, the ball throwing management computing device 14 establishes a connection with the user computing device 13.

Upon establishing a connection with the user computing device 13, in step 410, the plurality of sensors 23 within the ball throwing management computing device 14 receives health related information and the height associated with the user 12 via the established communication, although the ball throwing management computing device 14 can receive other types or amounts of information from the user computing device 13. In this example, the health related information received from the user computing device 13 relates to the body temperature, blood pressure of the user 12 respiratory rate of the user 12 and/or the heart rate associated with the user 12, although the health related information can include other types or amounts of information associated with the user 12.

In step 415, the ball throwing management computing device 14 detects the position of the user 12 using the camera 22, although the position of the user 12 can be detected using other techniques. In this example, the position of the user 12 relates to the distance of the user 12 from the ball throwing management computing device 14, the position of the user 12 with reference to the boundary lines, although the position of the user 12 can relate to other types or amounts of information. Additionally, the ball throwing management computing device 14 detects the height of the user 12 using the camera 22 and/or the information obtained from the user computing device 13, although the ball throwing management computing device 14 can detect the height of the user 12 using other techniques.

Alternatively in another example, the ball throwing management computing device 14 can detect the position of the user 12 or the distance of the user 12 from the ball throwing management computing device 14 by detecting the position of the user 12 relative to boundary lines of a court. By way of example, when the user 12 is positioned near the free throw line of a basketball court, the ball throwing management computing device 14 can detect the free throw line on the basket ball court and determine that the user 12 is standing 15 feet from the basketball ball ring or if the ball throwing management computing device 14 is near the basketball ring, then the ball throwing management computing device 14 can determine that the user 12 is 15 feet from the ball throwing management computing device 14.

In step 420, the ball throwing management computing device 14 determines the speed, direction, trajectory and frequency at which the ball can be propelled to the user 12. In this example, the ball throwing management computing device 14 uses the information regarding the position and height of the user 12 obtained from the camera 22 and the health related information obtained from the user computing device 13 to determine the speed and direction at which the ball can be propelled towards user 12, although the ball throwing management computing device 14 can use other parameters such as outside temperature, skill level of the user 12 to make the determination. By way of example only, when the body temperature of the user 12 is in a certain range of about ninety eight degree Fahrenheit and ninety nine degree Fahrenheit with a heart rate of in the range of seventy two to ninety, the ball throwing management computing device 14 can determine to propel the ball slightly away from the location of the user 12 at a higher speed so that user 12 would have to move to hit the propelled ball. In contrast, when the body temperature of the user 12 is higher than ninety nine degree Fahrenheit and the heart rate is above one hundred and forty, the ball throwing management computing device 14 can determine to propel the ball to the determined location of the user 12 at a slightly lower speed. Accordingly, the ball throwing management computing device 14 can linearly increase the speed at which the ball can be propelled to the user 12 and the direction of can be to the left, right, front or behind the user 12 until the threshold body temperature or the heart rate of the user 12 is reached. In this example, the threshold of the body temperature is one hundred and two degrees Fahrenheit and the heart rate can be one hundred and forty pulses a minute, although the threshold of the body temperate and the heart rate can be configured for other values by the user 12. By using the parameters such as health information associated with the user 12 and dynamically detecting the position and distance of the user 12 using camera 22, the technology disclosed herein provides advantages over the prior technologies by intelligently propelling the ball to the user 12 without requiring user intervention.

Alternatively in another example, the ball throwing management computing device 14 can also determine the speed and direction at which the ball can be propelled to the user 12 based on some user information along with the health related information received from the user computing device 13 and the position of the user detected using the camera 22. By way of example, the user information can relate the age, gender and physical condition of the user 12, although other types or amounts of information associated with the user can be used to determine the speed and direction to propel the ball.

Alternatively in yet another example, the ball throwing management computing device 14 can adjust the speed, direction and frequency at which the ball can be propelled based on voice commands from the user 12. By way of example only, the ball throwing management computing device 14 can use of combination of health information of the user 12, position and distance of the user 12 and voice commands such as "propel the ball to the left" to determine the speed and direction at which the ball can be propelled to the user.

Next in step 425, the ball throwing management computing device 14 assists with propelling the ball to the user 12 based on the determined speed and direction. In this example, while not shown the ball throwing management computing device 14 can use a ball propeller to propel the ball based on the determined speed and direction, although the ball throwing management computing device 14 can assist with propelling the ball to the user 12 using other techniques.

Next in step 430, the ball throwing management computing device 14 readjusts the direction and speed at which the ball can be propelled to the user 12 based on the real-time health related information received from the user computing device 13 and the distance and location of the user 12 that is determined using the camera 22 and the exemplary flow proceeds back to step 425 where the ball is propelled to the user 12 based on the readjusted direction and speed. In this example, the ball throwing management computing device 14 performs the step of readjusting the ball direction and speed using the technique illustrated in step 420, although the ball throwing management computing device 14 can use other techniques or parameters to make the readjustment. Additionally in this example, the ball throwing management computing device 14 can wait for a predetermined amount of time such as ten seconds before propelling the next ball at the user 12 using the readjusted speed and direction to make sure that the user 12 is ready to receive the next ball, although other parameters such as health information, distance, location and voice commands can be used to determine the frequency at which the ball can be propelled to the user 12.

The exemplary steps 425 and 430 repeats until the user 12 terminates the established communication between the user computing device 13 and the ball throwing management computing device 14.

Alternatively in yet another example, the ball throwing management computing device 14 can determine to step propelling the ball to the user 12 when the user 12 is detected to be out of range of the camera 22, when the user 12 is in a range that is very close to the ball throwing management computing device 14 (such as less than ten feet away) or when the user 12 is not in a position to receive the ball.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for intelligently throwing a ball to a dynamically detected user, the method comprising:
   receiving, by a ball throwing management computing device, health information associated with a user from a user computing device, wherein the health information further comprises a body temperature, a heart rate, and a blood pressure value, and wherein the body temperature of the user is at least ninety eight degree Fahrenheit;
   detecting, by the ball throwing management computing device, a location and a height of the user associated with the received health information, wherein the user is in a dynamic state and wherein the location of the user is detected based on a relative distance to one or more boundary lines;
   determining, by the ball throwing management computing device, a speed, a direction, a trajectory and a frequency at which a ball can be propelled to the user based on the received health information, the detected location, a voice command, and the height of the user without user manual intervention;
   assisting, by the ball throwing management computing device, propelling the ball to the user based on the determined speed, direction and frequency; and
   readjusting, by the ball throwing management computing device, the determined direction, frequency, and the speed of propelling the ball based on real time health related information and location information of the user.

2. The method as set forth in claim 1 wherein the received health information associated with the user comprises a heart rate, a body temperature, a blood pressure rate and a respiratory rate.

3. The method as set forth in claim 1 further comprising:
   receiving, by a ball throwing management computing device, most recent health information associated with the user from the user computing device;
   detecting, b, the ball throwing management computing device, a new location of the user associated with the received most recent health information; and
   determining, by the ball throwing management computing device, a new speed, a new direction and a new frequency at which a subsequent ball can be propelled to the user based on the received most recent health in and the detected new location of the user.

4. The method as set forth in claim 3 further comprising assisting, by the ball throwing management computing device, propelling the ball the user based on the determined new speed, new direction and new frequency.

5. A non-transitory computer readable medium having stored thereon instructions for intelligently throwing a ball to a dynamically detected user comprising machine executable code which when executed by at least one processor, causes the processor to perform steps comprising:
   receiving health information associated with a user from a user computing device, wherein the health information further comprises a body temperature, a heart rate, and a blood pressure value, and wherein the body temperature of the user is at least ninety eight degree Fahrenheit;
   detecting a location and a height of the user associated with the received health information, wherein the user is in a dynamic state and wherein the location of the user is detected based on a relative distance to one or more boundary lines;
   determining a speed, a direction, a trajectory and a frequency at which a ball can be propelled to the user based on the received health information, the detected location, a voice command, and the height of the user without user manual intervention;

assisting propelling the ball to the user based on the determined speed, direction and frequency; and readjusting the determined direction, frequency, and the speed of propelling the ball based on real time health related information and location information of the user.

6. The medium as set forth in claim 5 wherein the received health information associated with the user comprises a heart rate, a body temperature, a blood pressure rate and a respiratory rate.

7. The medium as set forth in claim 5 further comprising:

receiving most recent health information associated with the user from the user-computing device;

detecting a new location of the user associated with the received most recent health information; and determining a new speed, a new direction and a new frequency at which a subsequent ball can be propelled to the user based on the received most recent health information and the detected new location of the user.

8. The medium as set forth in claim 7 further comprising assisting propelling the ball the user based on the determined new speed, new direction and new frequency.

9. A ball throwing management computing device comprising:

a processor;

a memory, wherein the memory coupled to the processor which are configured to execute programmed instructions stored in the memory comprising:

receiving health information associated with a user from a user computing device, wherein the health information further comprises a body temperature, a heart rate, and a blood pressure value, and wherein the body temperature of the user is at least ninety eight degree Fahrenheit;

detecting a location and a height of the user associated with the received health information, wherein the user is in a dynamic state and wherein the location of the user is detected based on a relative distance to one or more boundary lines;

determining a speed, a direction, a trajectory and a frequency at which a ball can be propelled to the user based on the received health information, the detected location, a voice command, and the height of the user without user manual intervention;

assisting propelling the ball to the user based on the determined speed, direction and frequency; and readjusting the determined direction, frequency, and the speed of propelling the ball based on real time health related information and location information of the user.

10. The device as set forth in claim 9 wherein the received health information associated with the user comprises a heart rate, a body temperature, a blood pressure rate and a respiratory rate.

11. The device as set forth in claim 9 wherein the processor is further configured to execute programmed instructions stored in the memory further comprising:

receiving most recent health information associated with the user from the user computing device;

detecting a new location of the user associated with the received most recent health information; and determining a new speed, a new direction and a new frequency at which a subsequent ball can be propelled to the user based on the received most recent health information and the detected new location of the user.

12. The device as set forth in claim 11 wherein the processor is further configured to execute programmed instructions stored hi the memory further comprising assisting propelling the ball the user based on the determined new speed, new direction and new frequency.

13. The method as set forth in claim 1 further comprising:

determining, by the ball throwing management computing device, a time to propel a subsequent ball to the user; and assisting, by the ball throwing management computing device, to propel the subsequent hall to the user at the determined time.

14. The medium as set forth in claim 5 further comprising:

determining a time to propel a subsequent ball to the user; and assisting, to propel the subsequent ball to the user at the determined time.

15. The device as set forth in claim 9 wherein the processor is further configured to execute programmed instructions stored in the memory further comprising:

determining a time to propel a subsequent ball to the user; and assisting to propel the subsequent ball to the user at the determined time.

* * * * *